United States Patent
Lambertz

(10) Patent No.: US 6,505,731 B2
(45) Date of Patent: Jan. 14, 2003

(54) TRANSPORT DEVICE FOR STRAND MATERIALS IN CONTINUOUS PRODUCTION OF INFUSION BAGS FOR MAKING TEA

(75) Inventor: Stefan Lambertz, Hürth (DE)

(73) Assignee: Teepack Spezialmaschinen GmbH & Co. KG (DE)

( * ) Notice: Subject to any disclaimer, the term of this patent is extended or adjusted under 35 U.S.C. 154(b) by 52 days.

(21) Appl. No.: 09/849,195

(22) Filed: May 4, 2001

(65) Prior Publication Data

US 2002/0108837 A1 Aug. 15, 2002

(30) Foreign Application Priority Data

Feb. 9, 2001 (EP) .............................. 01103056

(51) Int. Cl.⁷ ..................... B65B 15/12; B65B 15/14; B65B 15/20; B65B 29/00; B65B 37/00
(52) U.S. Cl. ................. 198/468.9; 198/626.1; 226/172; 226/173
(58) Field of Search .............. 198/626.1, 692, 198/468.9; 271/272; 226/170, 172, 173

(56) References Cited

U.S. PATENT DOCUMENTS

| | | | |
|---|---|---|---|
| 2,472,440 A | | 6/1949 | Salfisberg |
| 3,807,615 A | * | 4/1974 | Crocker ...................... 226/172 |
| 4,031,816 A | * | 6/1977 | Matsuo ........................ 493/373 |
| 4,890,140 A | * | 12/1989 | Negoro et al. .............. 226/172 |
| 4,984,728 A | * | 1/1991 | Brinkmeier et al. ........ 226/172 |
| 5,072,637 A | * | 12/1991 | Reichental et al. ......... 226/172 |

FOREIGN PATENT DOCUMENTS

| | | |
|---|---|---|
| EP | 0 095 542 A | 12/1983 |
| EP | 0 186 867 A | 7/1986 |
| EP | 0 448 325 A | 9/1991 |
| NL | Nr. 423 205 | 4/1964 |
| WO | WO 93/07060 | 4/1993 |

* cited by examiner

Primary Examiner—Christopher P. Ellis
Assistant Examiner—Gene O. Crawford
(74) Attorney, Agent, or Firm—Cantor Colburn LLP

(57) ABSTRACT

This invention concerns a device for transporting a strand of carrier material which is connected, at least on one side, to individual chambers made of filter paper material, spaced apart, following one after another, closed on all sides, containing a quantity of substance and composed of a strip of carrier material, with at least two independently driven belts, one segment of which runs at least partly parallel to the strand of carrier material and having cams spaced apart on the side facing the strand of carrier material, whereby they grasp the strand of carrier material between the chambers and/or in the area where one chamber is connected to the strand of carrier material, working along with a support, and transport it with the movement of the belts.

12 Claims, 3 Drawing Sheets

TRANSPORT DEVICE FOR STRAND MATERIALS IN CONTINUOUS PRODUCTION OF INFUSION BAGS FOR MAKING TEA

FIELD OF THE INVENTION

This invention concerns a device for transporting a strand of carrier material that is connected on at least one side to individual chambers spaced apart, following one after another, closed on all sides, containing a quantity of substance and composed of a strip of carrier material.

DESCRIPTION OF THE RELATED ART

This type of strand of carrier material provided with chambers is transported especially in the continuous production of infusion bags for making tea. These types of infusion bags consist of at least one chamber that contains a quantity of a substance to be extracted, created by cross-sealing a tube made of filter material and one section of the strip of carrier material connected to the chamber which is used for handling and suspending the infusion bag.

It is either impossible or unsatisfactory to transport a strand of carrier material with chambers, as an intermediate product, especially in the continuous production of infusion bags for making tea, with conventional traction devices, for example tackle blocks, because the chambers made of filter paper material are filled and arranged on the strand of carrier material. The strand of carrier material can only be grasped at discrete places, since otherwise the chambers and/or the quantity of substance in the chambers is damaged. Another problem in the continuous production of infusion bags is with manufacturing tolerances. Thus, the distances between the chambers on the strand of carrier material differ sharply because of manufacturing tolerances which can increase, especially in continuous production, by mutual influence. The reason for these types of manufacturing tolerances is that there are tolerances in the printing of the carrier material, for example different distances between the printing marks on carrier materials with printing marks. This makes it more difficult to transport a strand of carrier material with chambers safely and especially with no damage.

SUMMARY OF THE INVENTION

In view of this state of the art, the purpose of the invention is to provide a device for transporting a strand of carrier material with chambers of the type mentioned at the beginning that allows damage-free, reliable, high-speed transport of a strand of carrier material with chambers.

For the technical solution, this invention provides a device of the type mentioned at the beginning, with at least two belts driven independently of one another, a segment of which runs at least partly parallel to the strand of carrier material, and they have cams that are spaced apart on the side facing the strand of carrier material that grasp the strand of carrier material between the chambers and/or in the area where a chamber is connected to the strand of carrier material by interacting with a support and transporting it with the movement of the belts.

In the invention, the strand of carrier material is grasped at discrete places and pulled in the transport direction. The device in the invention has the advantage that transporting a strand of carrier material with chambers is fast and reliable, and the fact that the grasping by the cams is between the chambers and/or in the area where one chamber is connected to the strand of carrier material ensures that the chambers are not damaged. The device in the invention thus permits transport with high production capacity.

The use of two belts driven independently of one another, one segment of which runs at least partly parallel to the strand of carrier material, that have cams spaced apart from one another on the side facing the strand of carrier material also makes it possible, because of the tolerances, especially printing mark tolerances, to equalize differencess in coordinating the division of the chambers on the strand of carrier material. Advantageously, the drives for the belts can be controlled in such a way that the two belts transport the strand of carrier material alternately, and a cam of one belt engages with the strand of carrier material and transports the strand of carrier material, while a cam on the other belt is put in a position to grasp the strand of carrier material and then transports the strand of carrier material. This allows the strand of carrier material to be transported in a position that is absolutely precise. Servo motors are advantageously used to drive the belts.

In another advantageous embodiment of the invention, the drives are controlled by printing marks, and the printing marks are preferably arranged on the strand of carrier material. Optical sensors are provided to control the drives on the transport device in the invention, and they detect the printing marks placed on the strand of carrier material and drive the belts in such a way that the cams can be brought into position to grasp the strand of carrier material.

In another advantageous embodiment of the invention, the belts of the transport device are arranged next to one another in the direction in which the strand of carrier material is transported, and the segments of the belts running at least partly parallel to the strand of carrier material at least partly overlap in the direction in which the strand of carrier material is transported. The belt areas therefore run perpendicular to the transport direction one after the other in the direction in which the strand of carrier material is transported.

Another very advantageous embodiment of the invention has two independently driven belts on both sides of the strand of carrier material that are opposite one another, at least in the area where the segment runs parallel to the strand of carrier material. Advantageously, the belts opposite one another are driven by a drive, and the cams of the opposite belts are purposely aligned in such a way that they form a mutual support, so the cams opposite one another on the opposite belts practically form tongs for grasping the strand of carrier material.

In another advantageous proposal, the cams are spring-mounted, at least on one side of the belts, to guarantee an absolutely secure hold and simultaneously rule out any damage to the strand of carrier material or the chambers. In one specific embodiment of the invention, the belts each run over a drive wheel, an output wheel and a tension wheel, which are arranged in the form of a triangle in relation to one another, and the segment parallel to the strand of carrier material runs between the drive wheel and the deflection wheel and is opposite the tension wheel. Because of the triangular arrangement of the drive wheel, the output wheel and the tension wheel, the transport device in the invention can be built extremely compactly. In one advantageous embodiment of the invention, the cams are distributed at spots on the belts in such a way that the strand of carrier material can be grasped in the area near the space or connection between every two chambers, or especially preferred every fourth chamber.

BRIEF DESCRIPTION OF THE DRAWINGS

Other details, features and advantages of the invention will be explained in greater detail below using the examples of embodiment shown in the figures.

DETAILED DESCRIPTION OF THE PREFERRED EMBODIMENT

Figure 1:
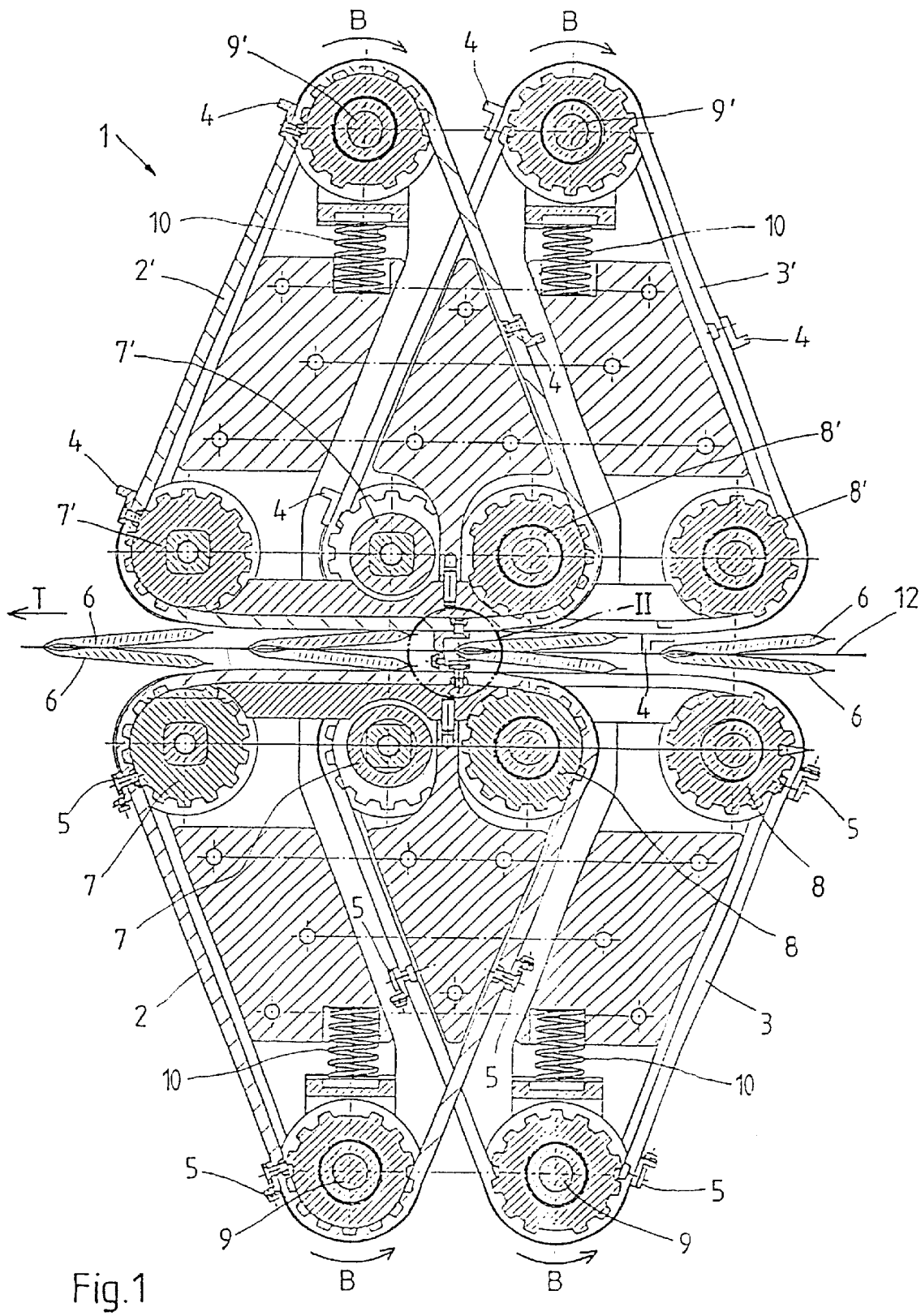
FIG. 1 shows a sectional side view of the transport device in the invention.
Figure 2:
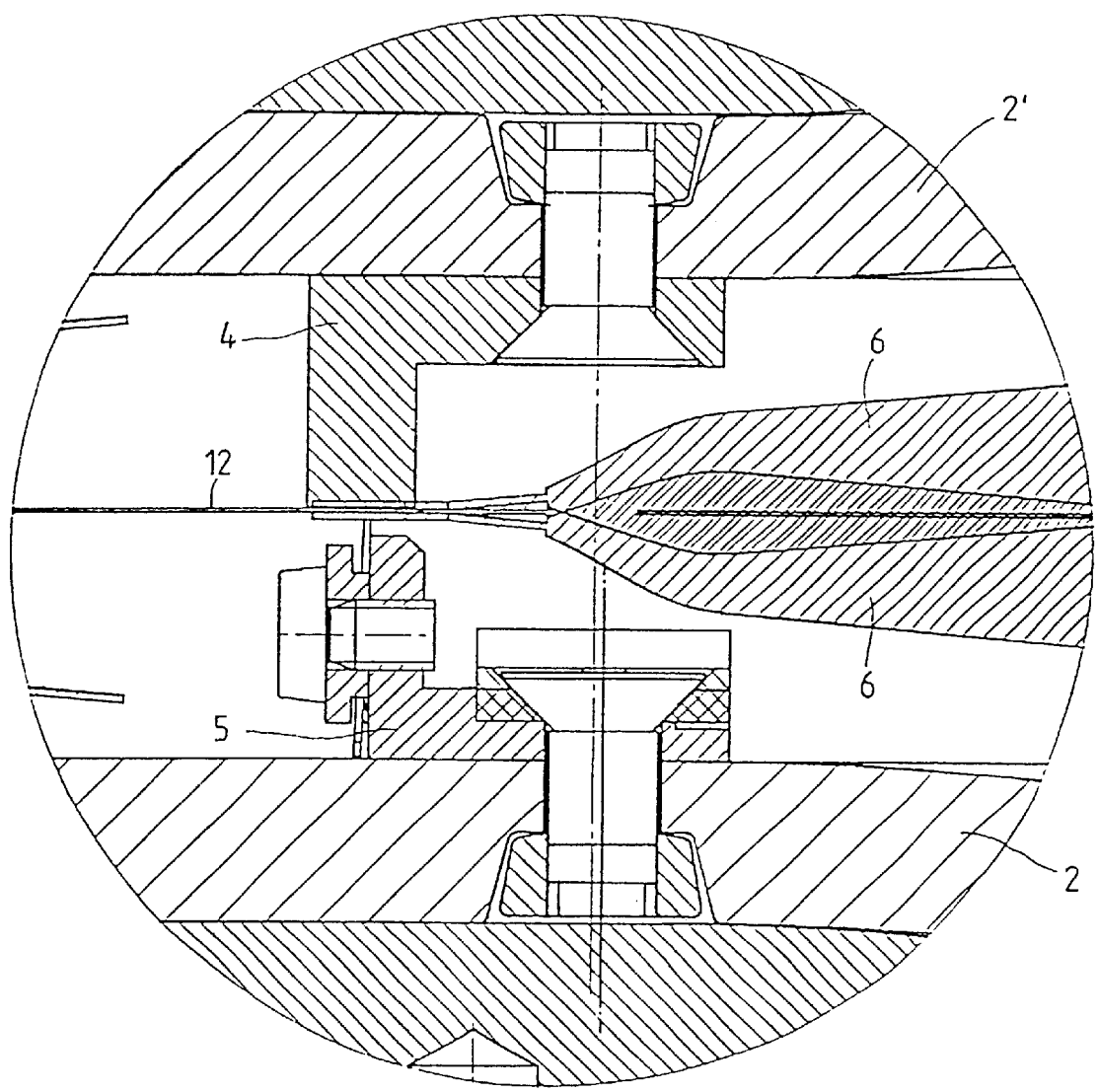
FIG. 2 shows an enlarged view of the area marked II in FIG. 1.
Figure 3:
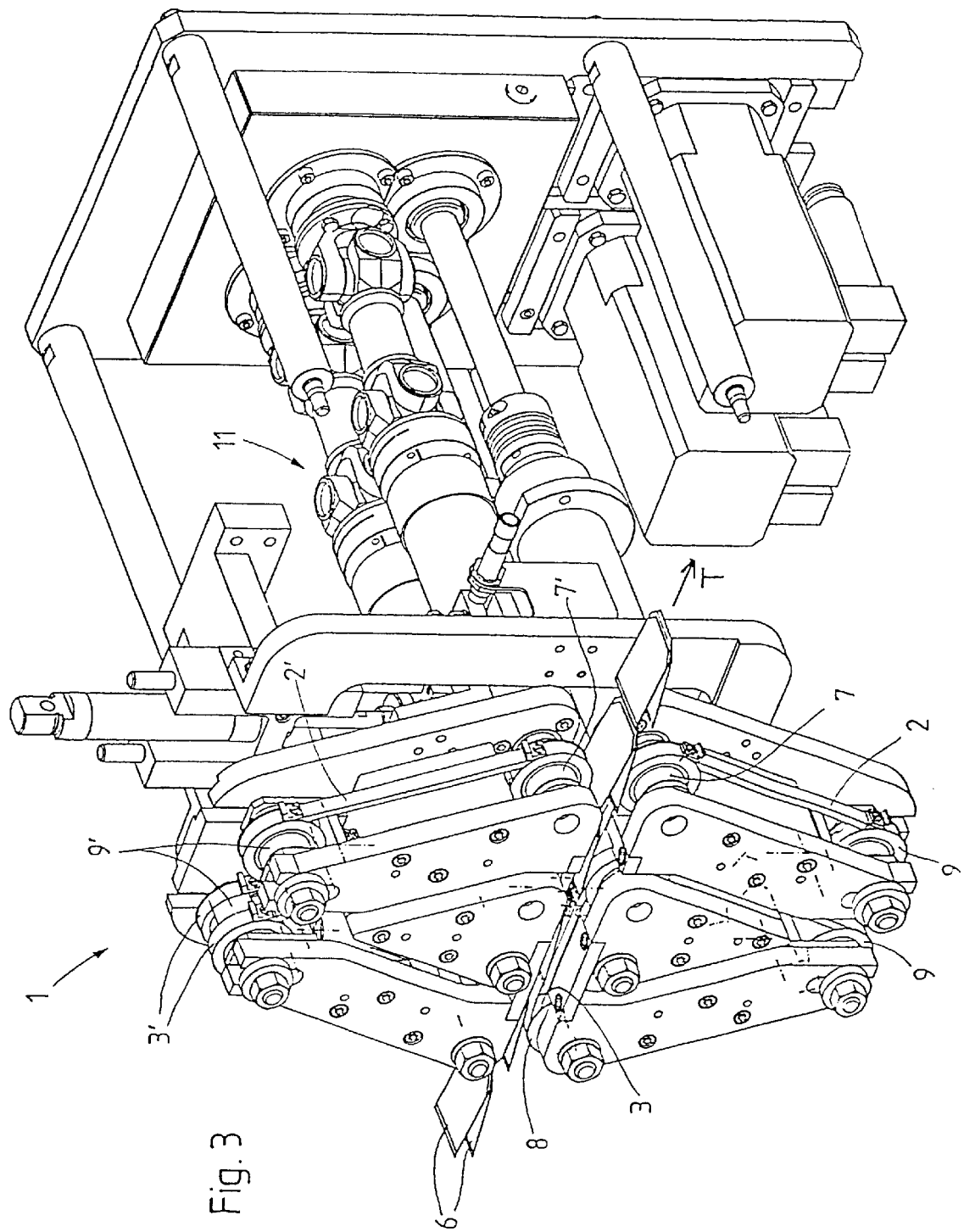
FIG. 3 shows a schematic, perspective side view of the transport device in FIG. 1.

The transport device 1 shown in FIGS. 1 to 3 is used to transport a strand 12 of carrier material made out of a strip-like carrier material, which is connected on both sides to individual chambers 6 that are spaced apart and follow one after another, are closed on all sides, contain a quantity of substance and are made out of a filter paper material.

The transport device 1 has four belts 2,2', 3 and 3' running over a drive wheel 7 and 7', a deflection wheel 8 and 8' and a tension wheel 9 and 9', one segment of which runs parallel to the strand 12 of carrier material. The drive wheels 7 and 7' of belts 2,2' and 3, 3' are coupled to one another, so that the belts 2,2' and 3,3' opposite one another on both sides of the strand 12 of carrier material move synchronously. As can be seen in FIG. 1, the tension wheels 9,9' of the four belts 2,2',3,3', are mounted with springs 10 to keep the belts 2,3 and 2',3' under tension. The drive wheels 7,7', deflection wheels 8, 8' and tension wheels 9, 9' are arranged in the form of a triangle in relation to one another, wherein the segment running parallel to the strand 12 of carrier material 12 runs between the drive wheel 7,7' and deflection wheel 8,8' and is opposite the tension wheel 9,9'. The drive wheels 7, 7', deflection wheels 8, 8' and tension wheels 9, 9' thus form the corners of the triangle. Because of this triangular arrangement of the belts 2,2' and 3,3', the transport device 1 has a compact design, and the belts 2,2' and 3,3' are long enough.

The belts 2,3 and 2',3' are provided with cams 4 and 5 on the side facing the strand 12 of carrier material. In this case, belts 2', 3', shown above in FIG. 1, are provided with four rigid cams 4 spaced apart on belts 2', 3', and, as can be seen in FIG. 2, they are designed as an L-shaped angle and screwed on belts 2' and 3'. Belts 2', 3' with cams 4 thus form a support for belts 2 and 3 with cams 5. Cams 5 are also designed to be L-shaped and are screwed on belts 2 and 3, which are spaced apart from one another. The smaller leg of the L that is perpendicular to the surface of belt 2 and 3 and thus perpendicular to the strand 12 of carrier material during transport is thus designed to be spring-mounted.

As can be seen in FIG. 3, belts 2,2',3,3' with cams 4 and 5 are driven by servo motors 11 and controlled in such a way that cams 4 and 5 of belts 2,2' and 3,3' opposite one another grasp the strand 12 of carrier material like tongs between the chambers 6 and in the area where the chambers 6 are connected to the strand 12 of carrier material. The strand 12 of carrier material is transported in direction T with the direction of movement B shown by an arrow in FIG. 1. The drives 11, here servo motors, and the belts 2,2' and 3,3' are controlled by printing marks made on the strand of carrier material. The cams of opposite belts 2,2' and 3,3' are alternately brought into position to grasp the strand 12 of carrier material, and the strand 12 of carrier material, as shown in FIG. 2, is grasped by opposite cams, while the cams of the pair of belts next to it transport the strand 12 of carrier material because the cams are still engaged. Belts 2,2' and 3,3' opposite one another thus taken turns transporting the strand 12 of carrier material. Thus, cams 4,5 of one belt 2,2' and 3,3' alternately transport strand 12 of carrier material, while cams 4,5 of the second belt 3,3' and 2,2' are put in the transport position to take over transport in a transport direction later in the future. The first belt of the device, controlled by the printing marks and the servo motors, runs in the transport position and transports the strand 12 of carrier material with chambers 6 a little bit further. During this time, the cams 4,5 of the second belt, which are provided for transport, disengage and are put in a predetermined further transport position for further transport of the strand 12 of carrier material with chambers 6. Here, the speed of the second belt is controlled by the servo motors, and the servo motors detect printing marks on the strand 12 of carrier material via an optical sensor, not shown explicitly here, and adjust the speed of the second belt accordingly, so that the cams 4, 5 on the second belt are put into the transport position and detect and transport the strand 12 of carrier material with chambers 6. As soon as the strand 12 of carrier material with chambers 6 is detected by cams 4,5 on the second belt, the cams 4,5 on the first belt disengage and are put into their new grasping position.

As can be seen in FIGS. 1 and 3, belts 2 and 3 and 2' and 3' are arranged overlapping for the strand 12 of carrier material and partly one after another in the transport area on part of the strand 12 of carrier material. This ensures that the strand 12 of carrier material is never transported by cams 4 or 5 of belts 2,2', 3 and 3' without stopping. As can also be seen from FIG. 1, cams 4 and 5 are spaced apart from one another on belts 2,2', 3,3' in such a way that they grasp only every second chamber 7 in a row on one side of the strand 12 of carrier material as opposite pairs of cams 4,5 of belts 2,2' and 3,3'.

The example of embodiment shown in the figures is used only to explain the invention and is not limited to it.

What is claimed is:

1. A device for transporting a strand of carrier material, which is connected at least on one side to individual chambers made out of filter paper material that are spaced apart, follow one after another, are closed on all sides, contain a quantity of substance and are composed of a strip-like carrier material, the device comprising:

at least two belts driven independently of one another, whose segments run at least partly parallel to the strand of carrier material; and cams spaced apart on a side of each of the belts facing the strand of carrier material, the cam grasping the strand of carrier material between the chambers and/or in the area where one chamber is connected to the strand of carrier material, by working with a support, and transporting the strand of carrier material with a movement of the belts.

2. The device in claim 1, wherein the belts are arranged next to one another in a direction of transport of the strand of carrier material, and the segments of the belts running at least partly parallel to the strand of carrier material at least partly overlap in the direction of transport of the strand of carrier material.

3. The device in claim 1, wherein the cams of at least one belt are spring-mounted.

4. The device in claim 1, wherein the belts run over a drive wheel, a deflection wheel and a tension wheel, which are arranged in the form of a triangle in relation to one another, and the segment running parallel to the strand of carrier material runs between the drive wheel and the deflection wheel and is opposite the tension wheel.

5. The device in claim 1, wherein the at least two belts include two independently driven belts arranged on both sides of the strand of carrier material, and opposite one another at least in the area of the segment running parallel to the strand of carrier material.

6. The device in claim 5, wherein the cams of the opposite belts are designed to form mutual supports.

7. The device in claim 5, wherein the opposite belts are driven by a common drive.

8. The device in claim 1, further comprising a driver for driving the belts.

9. The device in claim 8, wherein the driver includes a servo motor.

10. The device in claim 8, wherein the driver can be controlled in such a way that the two belts alternately transport the strand of carrier material, and one cam of one belt engages with the strand of carrier material and transports the strand of carrier material.

11. The device in claim 10, wherein the driver is controlled by printing marks.

12. The device in claim 11, wherein the printing marks are arranged on the strand of carrier material.

* * * * *